(12) United States Patent
Jakob et al.

(10) Patent No.: US 8,545,146 B2
(45) Date of Patent: Oct. 1, 2013

(54) DEVICE TO HOLD A WORK SPINDLE

(75) Inventors: Ludwig Jakob, Kleinwallstadt (DE);
Arno Woern, Obernburg (DE)

(73) Assignee: Jakob Antriebstechnik GmbH,
Kleinwallstadt (DE)

( * ) Notice: Subject to any disclaimer, the term of this patent is extended or adjusted under 35 U.S.C. 154(b) by 238 days.

(21) Appl. No.: 13/230,243

(22) Filed: Sep. 12, 2011

(65) Prior Publication Data

US 2012/0060657 A1 Mar. 15, 2012

(30) Foreign Application Priority Data

Sep. 13, 2010 (DE) .......................... 10 2010 045 113

(51) Int. Cl.
*B23B 19/02* (2006.01)

(52) U.S. Cl.
USPC ........................................... 409/231; 82/146

(58) Field of Classification Search
CPC ........ B23B 19/00; B23B 19/02; B23B 31/00;
B23B 31/36; B23Q 3/00; B23Q 1/70
USPC ........... 409/231; 82/142, 146, 147; 279/126
See application file for complete search history.

(56) References Cited

U.S. PATENT DOCUMENTS

| 4,890,522 | A | * | 1/1990 | Nader et al. ................. 82/142 |
| 5,636,949 | A | * | 6/1997 | Nakamura et al. ........... 409/230 |
| 6,357,565 | B1 | * | 3/2002 | Bolledi et al. ............... 188/371 |
| 6,939,094 | B2 | * | 9/2005 | Konishi ....................... 409/230 |
| 2004/0052601 | A1 | * | 3/2004 | Bernhard et al. ............ 409/231 |
| 2009/0018001 | A1 | | 1/2009 | Jakob |

FOREIGN PATENT DOCUMENTS

| DE | 202005009344 U1 | 12/2006 |
| DE | 102007032498 A1 | 1/2009 |

* cited by examiner

*Primary Examiner* — Daniel Howell
*Assistant Examiner* — Ryan Rufo
(74) *Attorney, Agent, or Firm* — Fleit Gibbons Gutman Bongini & Bianco PL; Martin Fleit; Paul D. Bianco

(57) ABSTRACT

The invention concerns a device to hold a motor-driven work spindle (1) in a housing of a processing machine with an outside ring (7) and an inside ring (6), arranged within the outside ring (7), so that it can be displaced and tilted axially, to hold the work spindle (1), wherein the inside ring (6) is pretensioned with respect to the outside ring (7), in an elastically resilient manner in the axial direction, by at least one pretension element (8), and wherein the inside ring (6) is held in an operating position within the outside ring (7) by a holding device with a prespecified holding force. The holding device is designed as a magnet arrangement (9) with at least one magnet (35, 36; 43), arranged in the inside ring (6) and/or the outside ring (7), for the creation of a magnetic holding force.

15 Claims, 4 Drawing Sheets

DEVICE TO HOLD A WORK SPINDLE

CROSS REFERENCE TO RELATED APPLICATIONS

This application claims priority under 35 U.S.C. §119 to German Patent Application No. 10 2010 045 113.4 filed Sep. 13, 2010, the entire contents of which are incorporated herein by reference.

FIELD OF THE INVENTION

The invention relates to a device to hold a motor-driven work spindle in a housing of a processing machine.

BACKGROUND OF THE INVENTION

In machine tools with motor-driven work spindles, enormous impact forces act on the work spindles for a brief period of time with tool collisions at high feed speeds. In order to ensure protection for impact-sensitive components during collisions, special safety concepts for making possible a deflection of work spindles are used.

From DE 10 2007 032 498 A1, a safety device for a motor spindle is known, arranged in a housing, with an outside ring and an inside ring arranged axially, so it can be displaced and tipped, within the outside ring, to hold the motor spindle. The inside ring is pretensioned, relative to the outside ring, in the axial direction, by several compression springs, distributed over the circumference. By means of the axially acting compression springs, the inside ring is pressed, with a prespecified pretension force, into an operating or starting position within the outside ring. For an additional holder of the inside ring in the operating position, radial barrier elements, which are impinged by springs, so as to mesh into corresponding indentations of the outside ring, are provided on the outside of the inside ring. Only when a threshold force is exceeded are the barrier elements pressed against the force of the springs, wherein the inside ring can disengage and move against the force of the axial compression springs. With this known device, the holding force, however, is produced exclusively by springs, which can have a disadvantageous effect on the rigidity of the entire arrangement.

SUMMARY OF THE INVENTION

The goal of the invention is to create a device to hold a motor-driven work spindle in a housing of a processing machine, which makes possible an optimal collision protection by decoupling the impact-sensitive work spindle from the force flow of a processing machine with a simultaneously high degree of rigidity, under operating conditions.

This goal is attained by a device as set forth in the independent claims. Appropriate refinements and advantageous embodiments of the invention are set forth in the dependent claims.

The device, in accordance with the invention, is conceived for incorporation in the force flow between the tool machine and a work spindle, which is constructed, for example, as a motor spindle. It contains an inside ring which can be firmly connected with the work spindle, and an outside ring which is arranged around the inside ring, in which the inside ring is arranged so that it can be displaced and tipped axially. The inside ring is pretensioned axially, relative to the outside ring, by pretension elements and it is pressed by them into a non-deflectable operating position. By means of a holding device, designed as a magnet arrangement, with at least one magnet arranged in the inside ring and/or the outside ring, the inside ring is held in the operating position with a magnetic holding force. The magnetic holding force can be designed in accordance with a prespecified limiting holding force or a limiting holding torque, so that the inside ring with the work spindle does not move relative to the outside ring with the proper load which is normal in operation. However, if the force acting on the motor spindle exceeds the holding force specified by the magnet arrangement, for example, in case of a collision, then the magnet arrangement brings about an immediate separation, a stop, between the outside and inside ring, so that the drive spindle can be displaced with a movement of the inside ring. Not only is an axial displacement possible thereby, but also a tilting movement of the work spindle in case of forces which are acting in a manner lateral or inclined, relative to the spindle axis.

If the work spindle is displaced from the operating position as a result of a collision, the magnetic holding force declines rapidly with an increasing air gap. Then, the pretension elements, constructed, for example, as compression springs, take over the support and guidance of the work spindle. A displacement of the inside ring, relative to the outside ring, leads to an increase in the pretension by the elastically resilient pretension elements, wherein the kinetic impact energy is absorbed. By means of the elastically resilient pretension elements, the work spindle is pressed back, once again, automatically, into the operating or starting position, even after a collision, so that a cumbersome dismantling and readjusting is not required. The device acting as a protective system for the work spindle is designed so that it is reversible and survives even multiple collisions in the life cycle of a machine, without damage. With the aid of the holding device, designed as a magnet arrangement, high and precisely dimensioned holding forces and torques can be attained. Until the maximum holding force is attained, the entire system, moreover, has a high system rigidity.

In a particularly expedient embodiment, the magnet arrangement contains other ring segment-shaped magnets, which can be arranged, distributed over the circumference of the inside ring and/or the outside ring. Preferably, magnets which attract one another are placed both on the inside ring as well as on the outside ring. In this way, high holding forces are attainable.

The magnets, acting between the inside ring and the outside ring, can be arranged, inclined between front stop surfaces, radially, or at a specified angle, relative to the middle axis of the inside or outside ring. It has become evident that a stabilization can be attained with tilting torques by an inclined arrangement of the magnets. The magnets can be placed, for example, at an angle of 0-45° C., relative to the stop surface, between the outside and inside ring.

In an embodiment which is self-sufficient, the magnets are appropriately constructed as permanent magnets. For the controlled change of the holding force, however, the magnets can also be constructed as electromagnets. The magnets can be used both in an adhesive (adhesive force) as well as a repellent (thrust or compressive force) arrangement between the inside and outside ring. Repellent magnet arrangements can also be basically constructed thereby as pressure elements and shock absorbers of the inside ring for the adhesive arrangement.

To improve damping and to avoid vibrations, additional damping elements made of foam, viscoelastic damping mats, or other suitable materials can be arranged between the inside ring and the outside ring. The kinetic impact energy in case of a collision can be absorbed by these additional damping elements.

For the centering and load torque absorption, it is also possible to provide a positioning device with, for example, positioning pins, arranged in the outside ring, and corresponding holding boreholes in the inside ring.

A relative movement between the inside and the outside can be detected by a proximity switch or other distance sensors and used as a signal to switch off the feed drive. Additional accelerator sensors can also be used to detect the contact between the outside and inside ring to evaluate a collision.

The pretension elements can be appropriately constructed as compression springs, by means of which the inside ring is pressed, with a front surface, against an annular stop surface of the outside ring. The pretension elements can also be constructed, however, as rubber-elastic pressure elements or as hydraulic or pneumatic pressure cushions and the like.

The inside ring can constructed as a continuous ring, as a part of the housing of the work spindle, or as a collet with radially elastic clamping segments. Nor is the shape of the outside ring limited. The outside ring can have an arbitrary outside contour for incorporation into a corresponding housing or can be integrated directly in the housing or another component of a tool machine.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
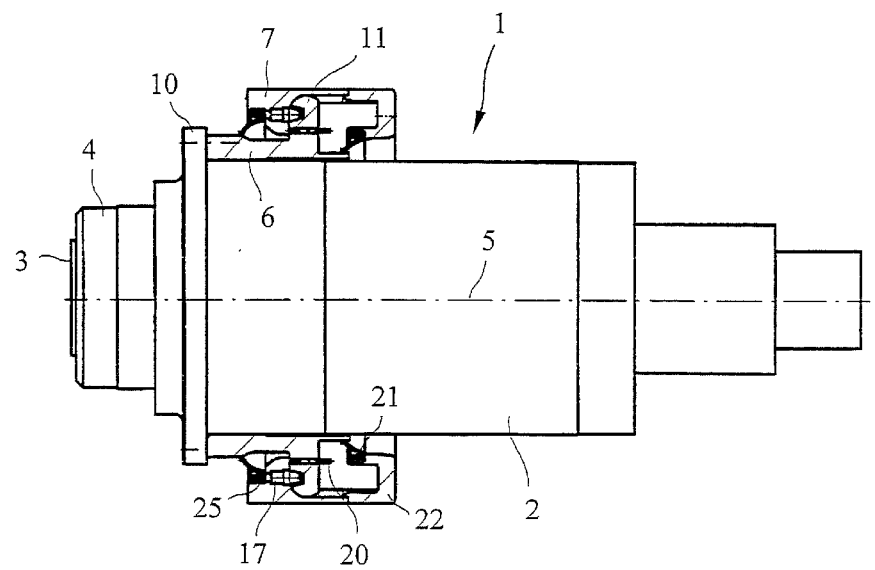
FIG. 1, a device to hold a work spindle of a processing machine, constructed as a motor spindle, in a longitudinal section.
Figure 2:
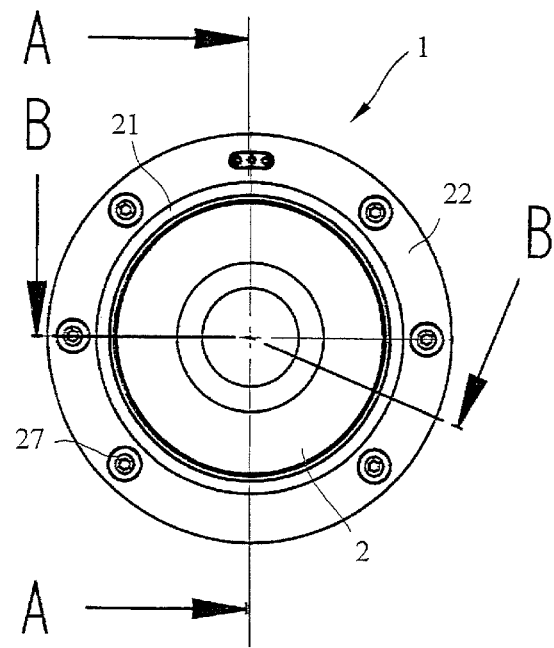
FIG. 2, the device of FIG. 1 in a rear view.

FIGS. 1 and 2 show a device to hold a work spindle 1, constructed here as a motor spindle, in a housing of a tool machine, which is not depicted, or another processing machine. The housing can, for example, be a part of a feed carriage, a machine frame, or another part of a tool machine. The work spindle 1, constructed as a motor spindle, contains a spindle housing 2, in which a spindle 4, provided with a tool holder 3, is supported, via a bearing, which is not depicted, in such a manner that it can rotate around a middle axis 5. The work spindle 1, constructed as a motor spindle, also has a drive motor, located in the spindle housing 3, in a manner which is, in fact, known, wherein the spindle 4 forms the rotor of the drive motor. The work spindle 1 can also have an integrated clamping device with a detachment unit, an internal lubricator supply, a cooling, and so forth, and thus forms a complete drive unit, which is used, above all, on milling or grinding machines, as a drive unit for the tools, but also for driven tool axles on lathes and so forth.

Figure 3:
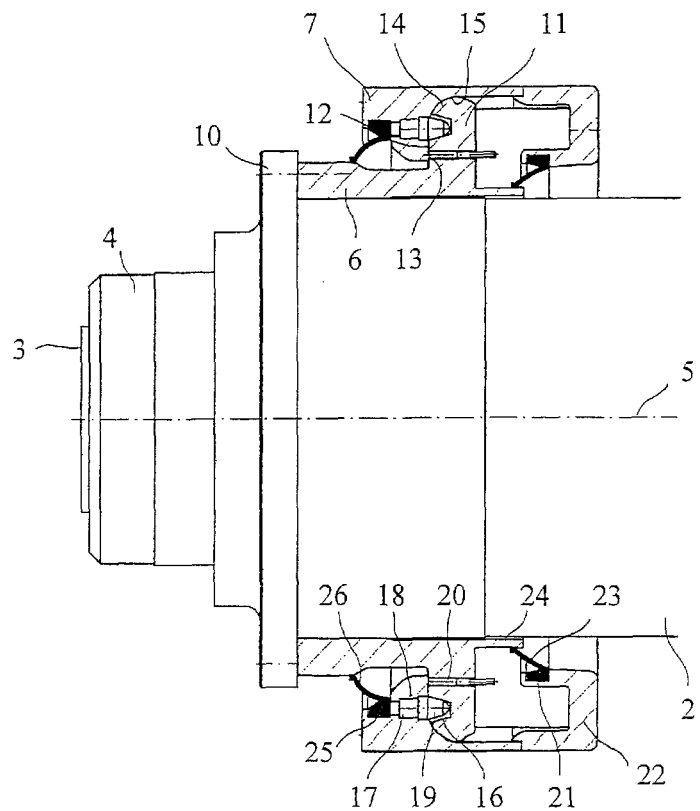
FIG. 3, an enlarged sectional view long the line A-A of FIG. 1.
Figure 4:
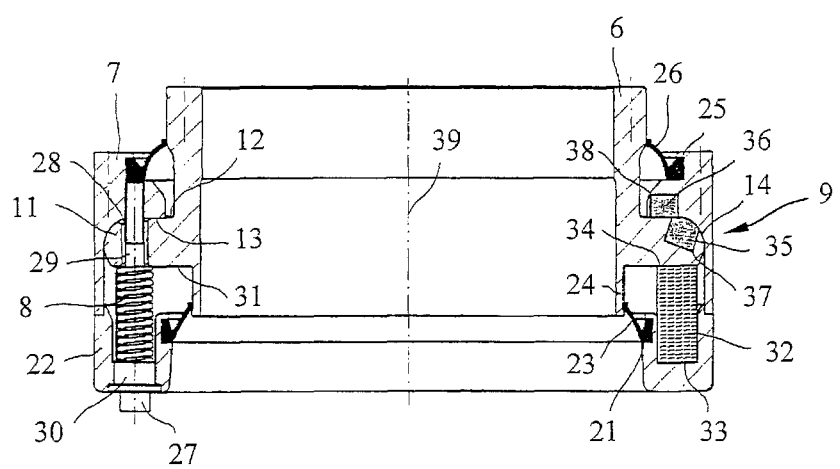
FIG. 4, an enlarged sectional view along the line B-B of FIG. 1.

As can be seen, in particular, in FIGS. 3 and 4, the invention comprises the device to hold the work spindle 1. The inside ring 6 is pretensioned, in an elastically resilient manner, against the outside ring 7 by the pretension elements 8, which can be seen in FIG. 4, in an axial direction, and is held by a magnet arrangement 9, which is explained in more detail, below, with a defined adhesive force in an operating position within the outside ring 7. The inside ring 6 can be firmly connected with a flange 10 of the spindle housing 2, for example, via screws or other affixing elements. The outside ring 7 can be affixed, for example, within a milling head or a milling machine, or in housings of lathes, or grinding or other processing machines. By means of the inside ring and outside ring 6 or 7, an interface is created between the tool machine and the work spindle 1, which is used for the protection of the work spindle 1 from collision damage.

In the embodiment example shown, the inside ring 6 comprises a radial flange 11 on its outside, which has a stop surface 12, which is vertical with respect to the middle axis of the inside ring 6, as a stop on an annular placement surface 13, on an inside heel of the outside ring 7, on its front side, pointing to the front end of the spindle 3. By means of a rounding off 14 on the outside of the annular flange 11, the inside ring 6 also fits snugly on a correspondingly rounded-off bearing surface 15 of the outside ring 7. Several conical boreholes 16, at a distance from one another, in the circumferential direction, are provided to hold positioning pins 17 in the stop surface 12 of the inside ring 6.

The positioning pins 17, affixed in corresponding axial boreholes 18 in the outside ring 7, have a head 19, which protrudes from the stop surface 13, so as to mesh with the conical boreholes 16 in the stop surface 12 of the inside ring 6. Inductive distance sensors 20 to detect a possible deflection of the inside ring 6 from the operating position are located in the ring flange 11 of the inside ring 6. A lid 22, provided with a first sealing 21, is affixed on the outside ring 7. The first sealing 21 has a sealing lip 23 for the stop on an inside annular heel 24 of the inside ring 6. Furthermore, in the outside ring 7, a second sealing 25, with a sealing lip 26 for the stop, is located on the outside of the inside ring 6.

Figure 5:
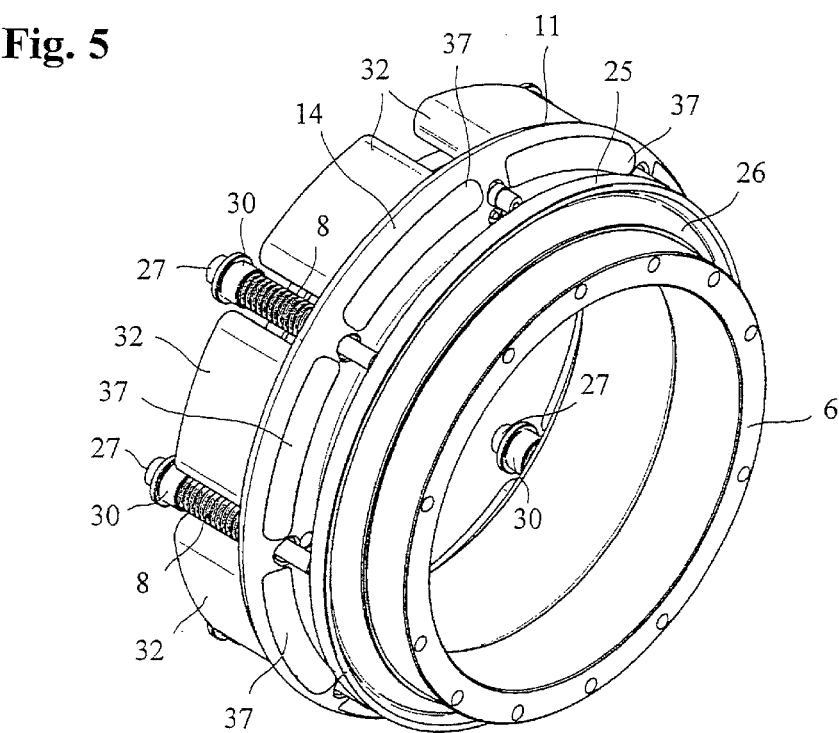
FIG. 5, an inside ring of the device shown in FIG. 1, in a perspective view.
Figure 6:
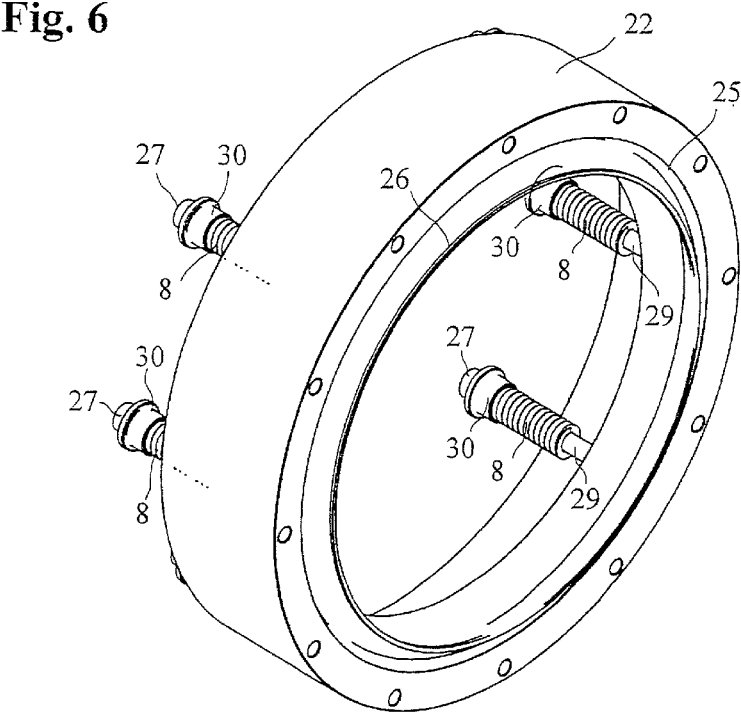
FIG. 6, a lid of the device shown in FIG. 1, in a perspective view.

As can be seen in FIG. 4, the lid 22 is connected with the outside ring 7 by several screws 27 in the circumferential direction, at a distance from one another. To make possible a tilting movement of the inside ring 6, relative to the outside ring 7, the screws 27 run, with a corresponding radial clearance, through axial passage boreholes 28 in the annular flange 11 of the inside ring 6. The pretension elements 8, constructed as helical springs in the depicted embodiment, are attached on the shaft 29 of the screws 27 and clamped on the side of the annular flange 11, opposite the stop surface 12, between a spacer sleeve 30 on the screw 27 and a rear front surface 31, facing the lid 22. By the pretension elements 8, constructed as helical springs, the inside ring 6 is pressed, with its stop surface 12, against the stop surface 13 of the outside ring 7. Between the lid 22 and the rear front surface 31 of the inside ring 6, ring segment-shaped damping elements 32 made of foam material, also depicted in FIG. 5, are also located in the gaps between the screws 27. The ring segment-shaped damping elements 32 as shown in FIG. 4 are placed in an inner groove 33 of the lid 22 and, with their end surface 34, which protrudes from the groove 31, fit snugly against the rear front surface 31 of the annular flange 11.

The magnet arrangement 9 to hold the inside ring 6 in an operating position within the outside ring 7 consists of magnets 35 and 36, working together, in the embodiment shown in FIG. 4, by means of which the inside ring 6 is pulled, with its stop surface 12, against the placement surface 13 of the outside ring 7, and is held in it with a defined holding force. In the embodiment example depicted in FIG. 4, several ring segment-shaped and mutually attracting magnets 35 and 36, in corresponding grooves 37 and 38 of the inside ring 6 and outside ring 7, are arranged, opposite one another, distributed uniformly over their circumference. The magnets 35 provided on the inside ring 6 are arranged, inclined in grooves 37 on the rounded-off outside of the ring flange 11, at an incline, relative to a middle axis 39 of the inside ring, whereas the magnets 36 provided in the outside ring 7 are directed toward the stop surface 12 on the front side and are accommodated in corresponding front grooves 38 in the placement surface 13 of the outside ring 7. FIG. 5 also shows the grooves 37, arranged in the rounding-off 14 on the outside of the ring flange 11, for the holding of the inclined magnets 35. A stabilization with tipping torques is attainable with the inclined arrangement of the magnets 35.

In the embodiment of FIG. 4, magnets 35 and 36, acting together, are provided both on the inside ring 6 and also on the outside ring 7. To attain a magnetic holding force, however, magnets can also be placed only on the inside ring or only on the outside ring. The magnets 35 and 36 are advantageously constructed as permanent magnets but can also be electromagnets.

Figure 7:
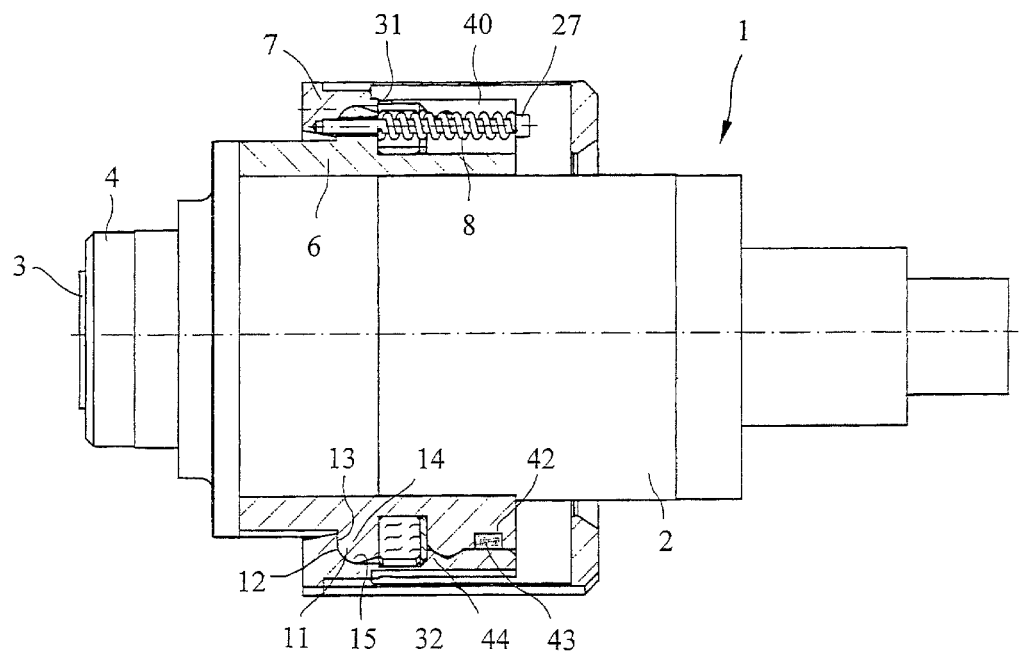
FIG. 7, another embodiment example of a device to hold a work spindle.
Figure 8:
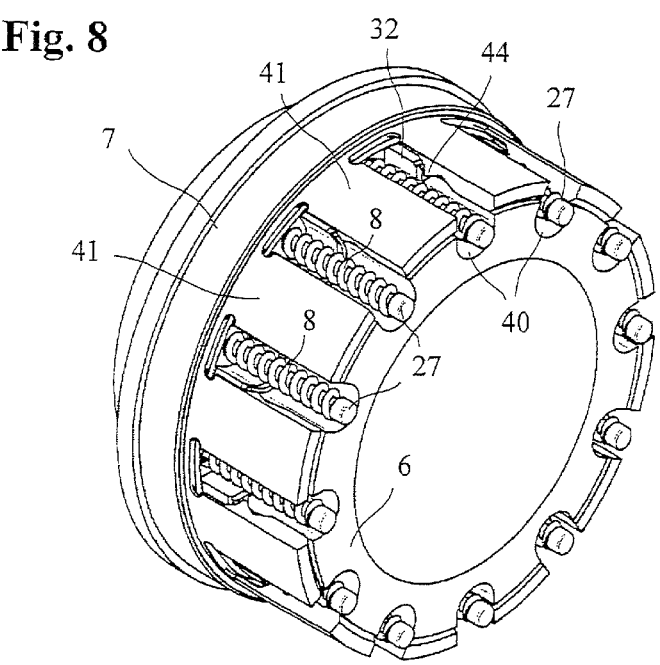
FIG. 8, an outside ring and an inside ring of the device of FIG. 7 in a perspective view.

FIGS. 7 and 8 show another embodiment example of a device to hold a work spindle 1, with an outside ring 7 and an inside ring 6, which is arranged within the outside ring so it can be displaced and tilted axially, for the holding of the work spindle 1. In this embodiment also, the inside ring 6 has a radial flange 11 on its outside, which, on its front side, pointing to the front end of the spindle 3, has a stop surface 12 for the stop on a corresponding placement surface 13 on an inside heel of the outside ring 7. By means of a rounding off 14 on the outside of the annular flange 11, the inside ring 6, moreover, fits snugly on a correspondingly rounded-off bearing surface 15 of the outside ring 7. Here too, the inside ring 6 is pressed against the placement surface 13 of the outside ring 7, with its front stop surface 12 by pretension elements 8, designed as helical springs. The pretension elements 8 are clamped between the head of a screw 27, screwed into the outside ring 7, and a rear front surface 31 of the ring flange 11. As can be seen from FIG. 8, the screws 27 are accommodated into radial recesses 40 of the inside ring 6 with the pretension elements designed as helical springs. Here too, additional damping elements 32 are provided between the inside ring 6 and the outside ring 7.

In contrast to the embodiment of FIGS. 1-6, the outside ring 7 in the embodiment example of FIGS. 7 and 8 is constructed like a collet, with several radially elastic clamping segments 41. The clamping segments 41, projecting toward the rear, are pretensioned, in a radially elastic manner and in the direction of the inside ring 6. Magnets 43 to hold the inside ring 6 in an operating position within the outside ring 7 are accommodated in radial grooves 42 on the outside of the inside ring 6. The damping elements 32 are arranged between the rear front surface 31 on the ring flange 11 of the inside ring 6 and an inside heel 43 on the clamping segments 41.

While various descriptions of the present invention are described above, it should be understood that the various features can be used singly or in any combination thereof. The invention described and claimed herein is not to be limited in scope by the specific embodiments herein disclosed, since these embodiments are intended solely as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. Device to hold a motor-driven work spindle in a housing of a processing machine, comprising an outside ring and an inside ring arranged within the outside ring so it can be displaced and be tilted axially, to hold a work spindle, wherein the inside ring is pretensioned in an elastically resilient manner in an axial direction, relative to the outside ring, by at least one pretension element, and wherein the inside ring is held in an operating position within the outside ring by a holding device with a prespecified holding force, wherein the holding device is designed as a magnet arrangement with at least one magnet, arranged in at least one of the inside ring and the outside ring, to produce a magnetic holding force.

2. Device according to claim 1, wherein the magnet arrangement comprises a plurality of ring segment-shaped magnets, distributed over the circumference of at least one of the inside ring and the outside ring.

3. Device according to claim 1, wherein the magnets attracting one another, are located on the inside ring and on the outside ring.

4. Device according to claim 1, wherein the magnets are arranged, inclined at an angle, relative to the middle axis of the inside ring or outside ring.

5. Device according to claim 1, wherein the magnets are designed as permanent magnets or electromagnets.

6. Device according to claim 1, wherein at least one additional damping element is located between the inside ring and the outside ring.

7. Device according to claim 1, wherein a positioning device operable for load torque absorption and for centering of the inside ring in the outside ring is located between the inside ring and the outside ring.

8. Device according to claim 7, wherein the positioning device in the outside ring contains affixed axial positioning pins to mesh into corresponding boreholes in a stop surface of the inside ring.

9. Device according to claim 1, wherein the magnets are arranged in at least one groove on the outside of a ring flange of the inside ring.

10. Device according to claim 1, wherein the magnets are located in at least one front-side groove in a stop surface of the outside ring.

11. Device according to claim 1, wherein the magnets are arranged in at least one radial groove on the outside of the inside ring.

12. Device according to claim 1, wherein the outside ring is designed as a collet with a plurality of radially resilient clamping segments.

13. Device according to claim 1, wherein a lid, provided with a first sealing can be affixed on the outside ring.

14. Device according to claim 1, wherein a second sealing operable for sealing with respect to the inside ring is arranged in the outside ring.

15. Device according to claim 1, wherein at least one of distance and acceleration sensors are located on the inside ring or the outside ring.

* * * * *